(12) United States Patent
Hsieh et al.

(10) Patent No.: US 7,738,018 B2
(45) Date of Patent: Jun. 15, 2010

(54) IMAGE CAPTURE CONTROL METHOD AND APPARATUS THEREOF

(75) Inventors: Wen-Hung Hsieh, Taichung (TW); Yu-Ting Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 336 days.

(21) Appl. No.: 11/849,467

(22) Filed: Sep. 4, 2007

(65) Prior Publication Data
US 2008/0174674 A1    Jul. 24, 2008

(30) Foreign Application Priority Data
Jan. 19, 2007    (TW) ............... 96102223 A

(51) Int. Cl.
*H04N 5/335* (2006.01)
(52) U.S. Cl. ................... 348/294; 348/363
(58) Field of Classification Search ............ 348/208.12, 348/296, 297, 362, 363, 229.1
See application file for complete search history.

(56) References Cited
U.S. PATENT DOCUMENTS
6,836,288 B1 * 12/2004 Lewis .................. 348/229.1

| 7,565,068 | B2 * | 7/2009 | Endo ............ 396/52 |
| 2004/0090532 | A1 * | 5/2004 | Imada .......... 348/208.16 |
| 2004/0239771 | A1 * | 12/2004 | Habe ............ 348/208.12 |
| 2007/0115383 | A1 * | 5/2007 | Tsukatani ...... 348/333.11 |

FOREIGN PATENT DOCUMENTS
JP    11215432    * 8/1999

* cited by examiner

*Primary Examiner*—Tuan Ho
(74) *Attorney, Agent, or Firm*—Thomas, Kayden, Horstemeyer & Risley

(57) ABSTRACT

An image capture control method and apparatus thereof is provided. The method includes capturing automatic exposure environmental data by an image capture unit, calculating initial shutter exposure period and initial sensitivity in accordance with the environmental data, and determining in accordance with the specific mode. Under the specific mode, capturing the image based on the initial shutter exposure period and initial sensitivity when the initial shutter exposure period is less than or equal to the predetermined period. Modify parameters for image capture to obtain final shutter exposure period and final sensitivity when the initial shutter exposure period exceeds the predetermined period. Capturing the image with the final shutter exposure period (t') and processing the captured image with the final sensitivity (ISO').

16 Claims, 3 Drawing Sheets

IMAGE CAPTURE CONTROL METHOD AND APPARATUS THEREOF

BACKGROUND OF THE INVENTION

1. Field of the Invention

The invention relates to an image capture apparatus, and more particularly, to a control method for improving captured image quality by applying electronic signals and apparatus thereto.

2. Description of the Related Art

Image capture devices, such as digital cameras or camera mobile phones, in order to meet user demands have become lighter and smaller.

One major problem in image capture devices is device movement during operation, especially for smaller, lighter less stable devices, which can seriously affect image capture quality.

Therefore, an image stabilizer or a vibration reducing device is provided in conventional image capture devices, for example, a sensor, such as a gyroscopic sensor, detecting the angle and speed of movement, calculates the amount of movement needed to compensate, and compensates for vibration accordingly utilizing a compensation lens group to maintain a stable image. However, such sensors are often apt to produce errors because of the effect of the environment parameters, such as temperature and humidity.

Furthermore, in conventional image stabilization in digital cameras, the image capture apparatus utilizes a processing unit to calculate the value needed to compensate with the data detected by the sensor and to drive the compensate lens group to compensate with the calculated value for image quality. Compensating with the calculated value by the compensate lens group, however, may cause mutual collision among the lenses if the movement thereof is too large.

Moreover, if a conventional optics method is used, to detect motion by the sensor and to compensate by the compensation lens group or the image capture unit according to the detected motion, the image capture device must add hardware elements such as sensor and driving system, increasing volume thereof.

What is called for is an electronic compensation method to stabilize images captured without increasing hardware architecture and the volume of the image capture apparatus.

BRIEF SUMMARY OF THE INVENTION

The invention provides an image capture control method and apparatus thereof with improved captured image quality by reducing the shutter exposure period and increasing the sensitivity.

The invention provides an image capture control method comprising capturing capturing an automatic exposure environmental data, calculating initial shutter exposure period (t) and initial sensitivity (ISO) according to the environmental data, capturing the image according to the initial shutter exposure period (t) and initial sensitivity (ISO) when the initial shutter exposure period (t) is less than or equal to a predetermined period (T), modifying parameters for image capture to obtain a final shutter exposure period (t') and a final sensitivity (ISO') when the initial shutter exposure period exceeds the predetermined period (T), and capturing the image with the final shutter exposure period (t') and processing the captured image with the final sensitivity (ISO').

The invention also provides an image capture control apparatus. The image capture control apparatus comprises a driving unit, a lens, an image capture unit, an analog-to-digital converter and a main control unit.

The lens comprises an aperture and a shutter for capturing images, wherein the aperture and the shutter are electrically connected to the driving unit.

The image capture unit captures the image according to the formation of the image by the lens.

The analog-to-digital converter is connected to the image capture unit for converting analog image signals output by the image capture unit to digital image signals.

The main control unit is connected to the driving unit, driving the driving unit to control the aperture and the shutter, wherein the main control unit is connected to the analog-to-digital converter for accumulatively storing digital image data output by the image capture unit, and evaluating environmental brightness according to the digital image data.

The invention utilizes the digital image data to evaluate environmental brightness such that the main control unit modifies the shutter exposure period and the sensitivity according to a predefined rule. When the initial shutter exposure period exceeds a predetermined period, the main control unit drives the driving unit to control the shutter to expose with shorten final shutter exposure period (t'), and return the signal to the analog-to-digital converter to increase sensitivity.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
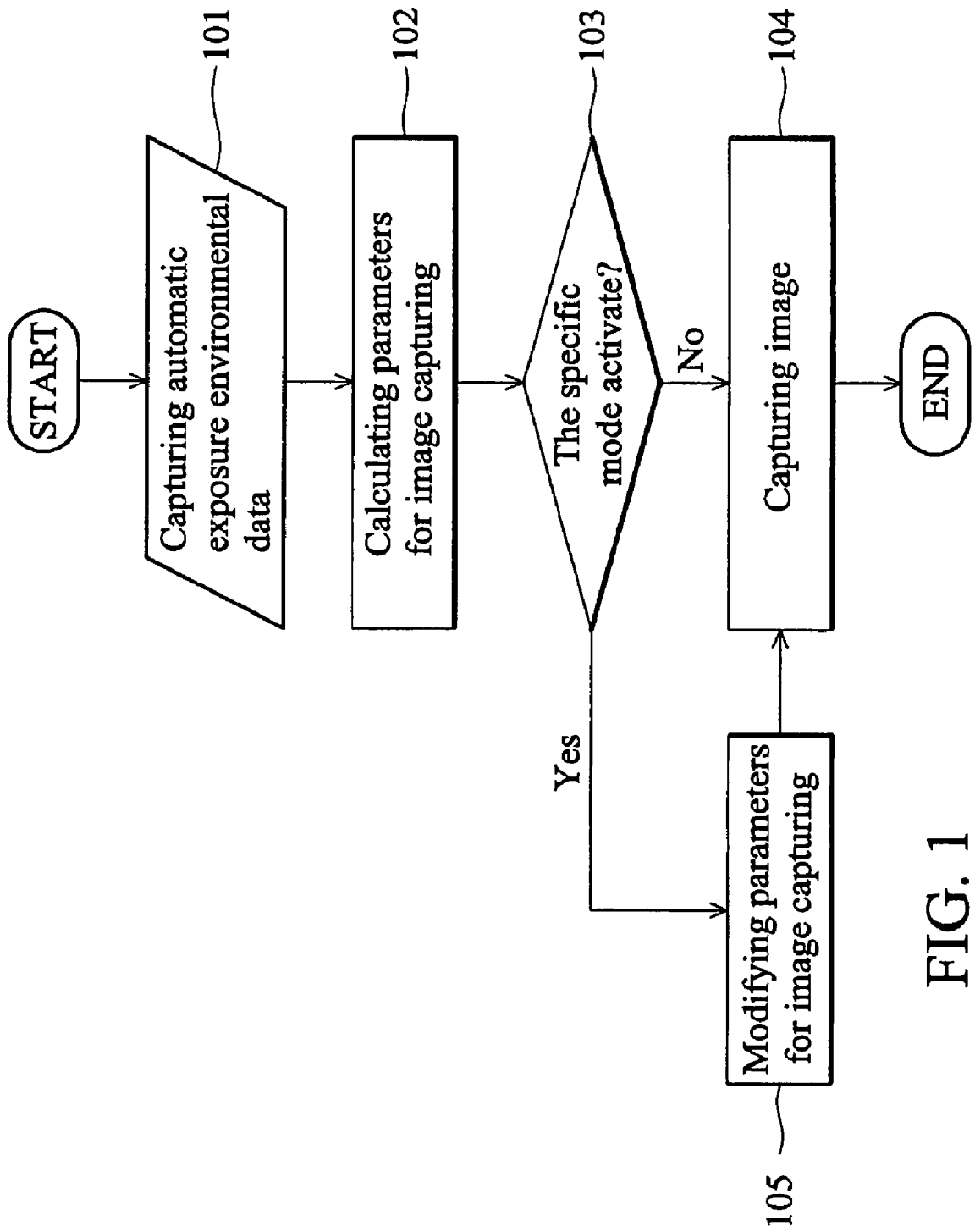
FIG. 1 is a flowchart of an image capture control method according to an embodiment of the invention.

FIG. 1 is a flowchart of an image capture control method according to an embodiment of the invention. Note that the image capture control method of the invention can be used in an image capture system or apparatus, such as a digital camera.

In step 101, automatic environmental data is obtained by receiving image data based on the predetermined automatic exposure parameter after the image capture apparatus is activated.

In step 102, when the image capture apparatus receives commands for pre-shooting the image, the state of the image capture apparatus is a pre-shooting state. Under the pre-shooting state, the image capture apparatus obtains pre-shoot image data and calculates environmental parameters, such as environmental brightness parameter Bv, aperture parameter Av, shutter parameter Tv, sensitivity parameter Sv or the like. Meanwhile, the shutter parameter Tv is equal to the initial shutter exposure period (t) and the sensitivity parameter Sv is equal to the initial sensitivity (ISO).

In step 103, it is then determined whether the image capture apparatus is under a specific mode wherein a stability image capture function has been activated. If not, step 104 is executed, and if so (Yes in step 103), step 105 is executed.

In step 104, the image is exposed and captured based on the aperture parameter Av and the initial shutter exposure period (t) calculated in step 102, and the captured image data is processed based on the initial sensitivity (ISO) by the image capture apparatus.

In step 105, under the specific mode wherein the stability image capture function has been activated, the initial shutter exposure period (t) calculated in step 102 is compared. If the initial shutter exposure period (t) exceeds a predetermined period, the final shutter exposure period (t') and the final sensitivity (ISO') are evaluated according to a predefined rule, and the shutter parameter Tv and the sensitivity parameter Sv are modified to the final shutter exposure period (t') and the final sensitivity (ISO') respectively. Then, step 104 is repeated, the image is exposed and captured based on the final shutter exposure period (t'), and the captured image data is processed based on the final sensitivity (ISO') by the image capture apparatus.

Figure 2:
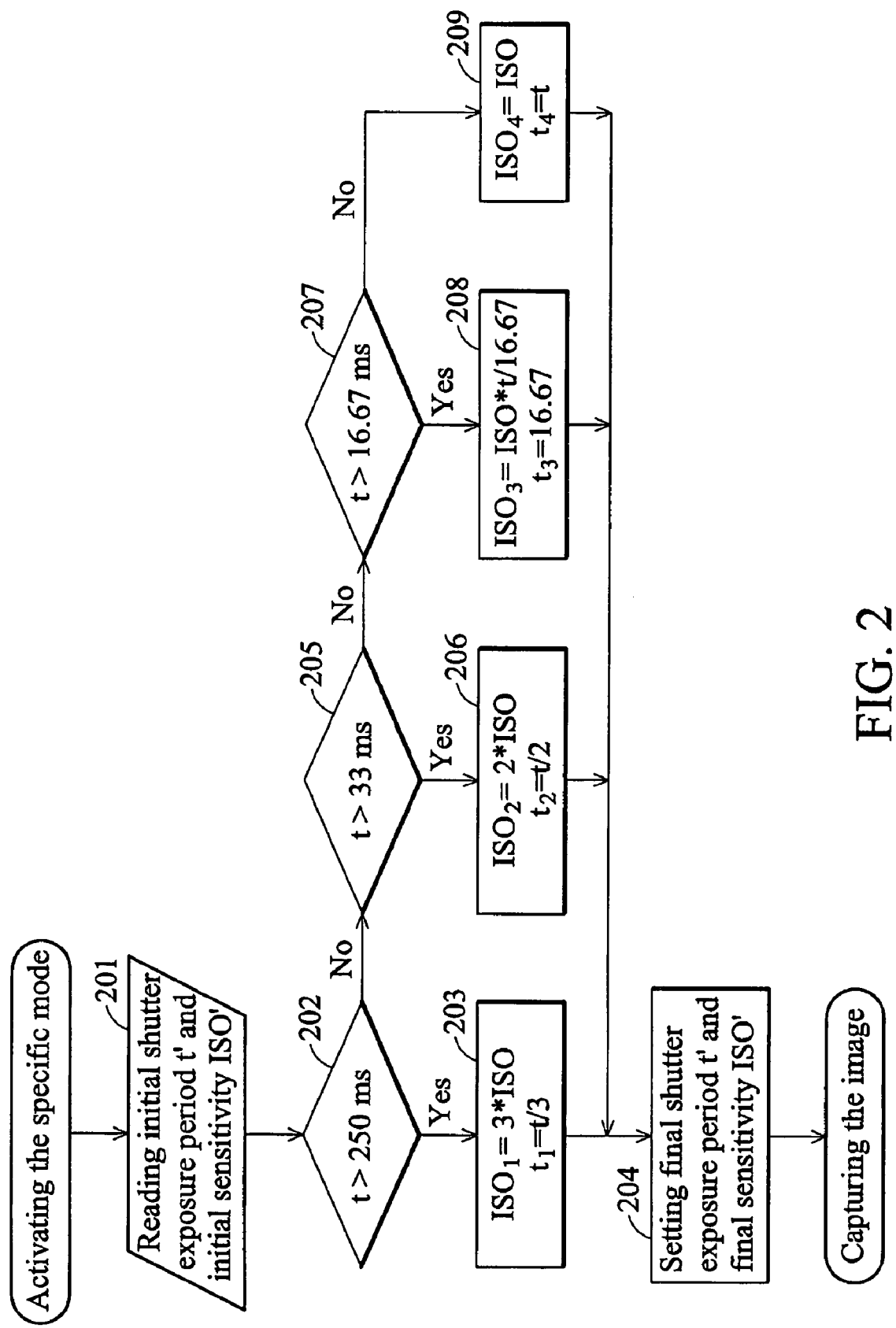
FIG. 2 is a flowchart of an image capture control method under the specific mode according to an embodiment of the invention.

Referring now to FIGS. 1 and 2, in step 102 parameters for image capture include environmental brightness parameter Bv, aperture parameter Av, shutter parameter Tv and sensitivity parameter Sv, wherein the shutter parameter Tv is equal to the initial shutter exposure period (t) and the sensitivity parameter Sv is equal to the initial sensitivity (ISO). Under the specific mode that has been activated, step 105 to re-modify or confirm the modified final shutter exposure period (t') and final sensitivity (ISO') is executed as follows.

When the system is predetermined to be activated under the specific mode, step 201 is executed such that the initial shutter exposure period (t) and the initial sensitivity (ISO) calculated in step 102 are obtained.

As in step 202, it is determined whether the initial shutter exposure period (t) exceeds a first period, such as 250 ms. If so, step 203 is executed, the initial shutter exposure period (t) is reduced to one-third of its original value and the initial sensitivity (ISO) is increased to three times its original value. That is, the initial shutter exposure period (t) is modified to a first shutter exposure period ($t_1$) and the initial sensitivity (ISO) is modified to a first sensitivity ($ISO_1$), where $t_1$=t/3 and $ISO_1$=3*ISO.

Next, as in step 204, the system changes the modified final shutter exposure period (t'=$t_1$) to the shutter parameter Tv and changes the modified final sensitivity (ISO'=$ISO_1$) to the sensitivity parameter Sv, and exposes and captures the image as in step 104 of the FIG. 1 based on the final shutter exposure period (t') and final sensitivity (ISO').

As in step 205, it is determined whether the initial shutter exposure period (t) exceeds a second period, such as 33 ms. If not, i.e. the initial shutter exposure period (t) is less than or equal to the second period, step 207 is executed. If so (Yes in step 205), step 206 is executed, the initial shutter exposure period (t) is reduced to half of its original value and the initial sensitivity (ISO) is increased to two times its original value. That is, the initial shutter exposure period (t) is modified to a second shutter exposure period ($t_2$) and the initial sensitivity (ISO) is modified to a first sensitivity ($ISO_2$), where $t_2$=t/2 and $ISO_2$=2*ISO. Then, as in step 204, the system changes the modified final shutter exposure period (t'=$t_2$) to the shutter parameter Tv and changes the modified final sensitivity (ISO'=$ISO_2$) to the sensitivity parameter Sv, and exposes and captures the image as in step 104 of FIG. 1 based on the final shutter exposure period (t') and final sensitivity (ISO').

As in step 207, it is determined whether the initial shutter exposure period (t) exceeds a predetermined period (T), such as 16.67 ms. If not, i.e. the initial shutter exposure period (t) is less than or equal to the predetermined period (T), step 209 is executed. If so (Yes in step 207), step 208 is executed, the initial shutter exposure period (t) is modified to a third shutter exposure period ($t_3$) and the initial sensitivity (ISO) is modified to a third sensitivity ($ISO_3$), wherein the third shutter exposure period ($t_3$) is equal to the predetermined period (T), i.e. 16.67 ms, and the third sensitivity ($ISO_3$) is equal to the initial sensitivity (ISO) times the initial shutter exposure period (t) and then further to divided to the predetermined period (T), i.e. $ISO_3$=ISO*t/T. For example, if the predetermined period T is 16.67 ms, the third sensitivity ($ISO_3$) can be obtained by:

$$ISO_3=ISO*t/16.67.$$

Then, as in step 204, the system changes the modified final shutter exposure period (t'=$t_3$) to the shutter parameter Tv and changes the modified final sensitivity (ISO'=$ISO_3$) to the sensitivity parameter Sv, and exposes and captures the image as in step 104 of the FIG. 1 based on the final shutter exposure period (t') and final sensitivity (ISO').

As in step 209, if the initial shutter exposure period (t) is less than the predetermined period (T), such as 16.67 ms as shown in FIG. 2, the initial shutter exposure period (t) and the initial sensitivity (ISO) are unchanged. Thus, as in step 204, the system reconfirms the shutter parameter Tv to the final shutter exposure period (t'), i.e. the initial shutter exposure period (t), and reconfirms the sensitivity parameter Sv to the final sensitivity (ISO'), i.e. the initial sensitivity (ISO) and then exposes and captures the image as in step 104 of the FIG. 1 based on the final shutter exposure period (t') and final sensitivity (ISO').

It is to be noted that, in other embodiments, the predetermined period (T), the first and the second periods can be adjusted and varied according to the parameters and requirements of the image capture apparatuses utilized.

Figure 3:
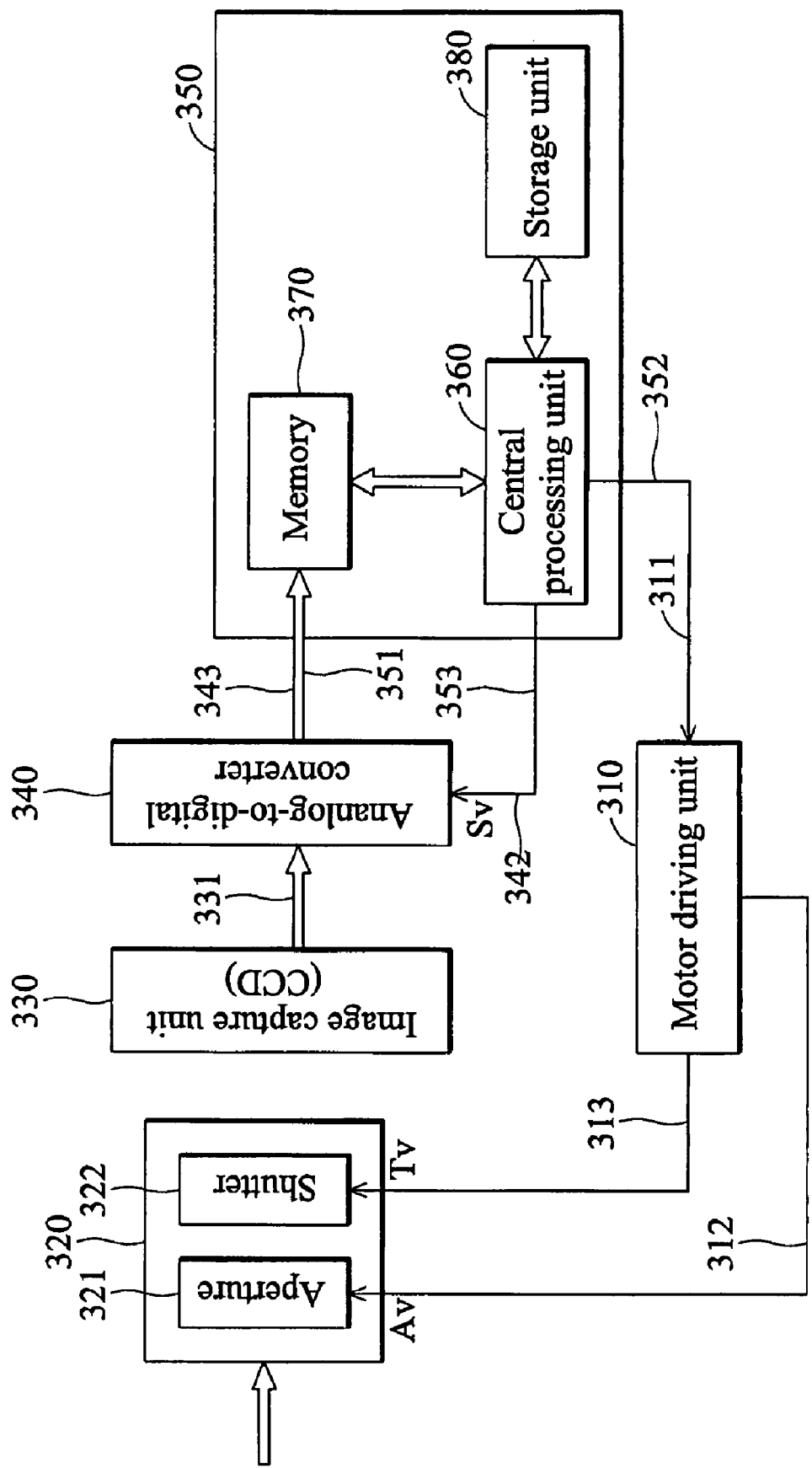
FIG. 3 is a schematic block diagram of an image capture control apparatus according to an embodiment of the invention.

FIG. 3 is a schematic block diagram of an embodiment of an image capture control apparatus according to the invention, which can apply the disclosed image capture control method. The details of the image capture control method are as aforementioned and thus are omitted here for brevity.

The embodiment of the image capture control apparatus, according to the invention, comprises a motor driving unit 310, a lens 320, an image capture unit 330, an analog-to-digital converter 340 and a main control unit 350.

The motor driving unit 310 comprises an input terminal 311, a first output terminal 312 and a second terminal 313.

The lens 320 captures the image and comprises an aperture 321 and a shutter 322. The aperture 321 is electrically connected to the first terminal 312 of the motor driving unit 310 for receiving a control signal Av from the motor driving unit 310, and the shutter 322 is electrically connected to the second terminal 313 of the motor driving unit 310 for receiving a control signal Tv from the motor driving unit 310.

The image capture unit 330 captures the image according to the formation of the image by the lens 320. The image capture unit 330 comprises an output terminal 331. The image capture unit 330 receives light beams generated from outside of the image capture control apparatus through the lens 320. In this embodiment, the image capture unit 330 may be, for example, any one of the charge coupled device (CCD) and complementary metal oxide semiconductor (CMOS).

The analog-to-digital converter 340, or analog front end (AFE), converts analog image signals, output by the image capture unit 330, into digital image signals, and comprises a first input terminal 341, a second input terminal 342 and an output terminal 343. The first input terminal 341 is connected to the output terminal 331 of the image capture unit 330 for transmitting the analog image signals output by the image capture unit 330.

The main control unit 350 has an input terminal 351, a first output terminal 352 and a second output terminal 353. The main control unit 350 comprises a central processing unit 360, a memory 370 and a storage unit 380. The memory 370 may be, for example, a synchronous dynamic random access memory (SDRAM) coupled between the main control unit 350 and the analog-to-digital converter 340 for accumulatively storing digital image data. The storage unit 380 may be a removable storage unit configured within the image capture control apparatus and data thereof may be stored and erased repeatedly. The storage unit 380 may be, for example, CompactFlash (CF) cards, Secure Digital (SD) cards, Memory Sticks (MS) cards or the like.

The first output terminal 352 of the main control unit 350 is connected to the output terminal 311 of the motor driving unit 310 for transmitting the driving signal to the motor driving unit 310 such that motor driving unit 310 is driven to control the exposure of the shutter 322 and opening diameter of the aperture 321. The input terminal 351 is connected to the output terminal 343 of the analog-to-digital converter 340, receiving the digital image data output by the analog-to-digital converter 340. The second output terminal 353 is connected to the second output terminal 342 of the analog-to-digital converter 340, sending a control signal Sv to the analog-to-digital converter 340.

After outer light beams are transmitted into the image capture control apparatus through the lens 320, the image capture unit 330 receives and converts the light beams to analog image signals, converts the analog image signals into digital image signals using the analog-to-digital converter 340, and sends the digital image signals to the storage unit 380. Upon receiving an image capture or exposure lock (AE Lock) command, the central processing unit 360 captures digital image signal at that moment from the storage unit 380, and calculates the environmental brightness parameter Bv, aperture parameter Av, shutter parameter Tv and sensitivity parameter Sv. Shutter parameter Tv is equal to the initial shutter exposure period (t) and the sensitivity parameter Sv is equal to the initial sensitivity (ISO). If the image capture control apparatus is configured to the specific mode such that an image stabilization function is activated, the central processing unit 360 first determines whether the initial shutter exposure period (t) exceeds a predetermined period before it sends out the image capture command. If not, i.e. the initial shutter exposure period (t) is less than or equal to the predetermined period, the initial shutter exposure period (t) and the initial sensitivity (ISO) are taken as the final shutter exposure period (t') and the final sensitivity (ISO') respectively. If so, i.e. the initial shutter exposure period (t) exceeds the predetermined period, the final shutter exposure period (t') and the final sensitivity (ISO') are set according to a predefined rule. After the final shutter exposure period (t') and the final sensitivity (ISO') have been confirmed, the central processing unit 360 utilizes the final shutter exposure period (t') and the final sensitivity (ISO') to set the shutter parameter Tv and sensitivity parameter Sv respectively, and sends a driving signal to direct the driving unit 310 to control the aperture 321 and the shutter 322 based on the aperture parameter Av 310 and the shutter parameter Tv respectively. Accordingly, the central processing unit 360 sends the sensitivity parameter Sv to the analog-to-digital converter 340 through the second output terminal 353 of the main control unit 350, thereby driving the analog-to-digital converter 340 to process the digital image signal based on the final sensitivity (ISO').

It is to be understood that, when the image capture apparatus or system is activated, the image capture unit receives light based on the predefined automatic exposure parameter repeatedly even if no image capture or exposure lock (AE Lock) command is received. Therefore, when the image capture or the exposure lock (AE Lock) command is received, the image capture system receives the exposure data of image data prior to the current time for calculating the environmental brightness parameter Bv, aperture parameter Av, shutter parameter Tv and sensitivity parameter Sv. Predefined automatic exposure parameter can be adjusted based on the mode required, such as night-shot mode, motion picture mode, macro focusing/telephoto mode, or the like.

The predefined rules to modify the shutter exposure period (t') of the image capture system are the same as shown in FIG. 2, and thus details are omitted here.

In conclusion, to ensure captured image quality, the invention provides method and apparatus referring to environmental conditions and determining whether the initial shutter exposure period (t) is too long so as to control the exposure period and the sensitivity. By reducing the exposure period and increasing the sensitivity, image distortion can be reduced. The image capture control apparatus of the invention, therefore, utilizes the environmental conditions (e.g. brightness) to modify and to fix the exposure period and the sensitivity at any time according to the environment it stated. Therefore, since the shutter exposure period is reduced, the vibration interference problem of the image capture system during capturing the image is relatively reduced, thereby stabilizing images captured.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. An image capture control method, comprising:
   (A) capturing automatic exposure environmental data;
   (B) calculating initial shutter exposure period (t) and initial sensitivity (ISO) according to the environmental data;
   (C) capturing the image according to the initial shutter exposure period (t) and the initial sensitivity (ISO) when the initial shutter exposure period (t) is not larger than a predetermined period (T);
   (D) modifying parameters for image capture to obtain a final shutter exposure period (t') and a final sensitivity (ISO') when the initial shutter exposure period exceeds the predetermined period; and
   (E) capturing the image with the final shutter exposure period (t') and processing the captured image with the final sensitivity (ISO'),
   wherein step (D) further comprises, if the initial shutter exposure period t exceeds a first period, setting the final exposure period (t') and the final sensitivity (ISO') by the formula:

$t' = t/3;$ $ISO' = 3*ISO,$ wherein ISO represents the initial sensitivity.

2. The image capture control method as claimed in claim 1, wherein the first period is equal to 250 ms.

3. The image capture control method as claimed in claim 1, wherein step (D) further comprises, if the initial shutter exposure period t is not larger than the first period and exceeds a second period, setting the final exposure period (t') and the final sensitivity (ISO') by the formula:

$$t'=t/2;$$

$$ISO'=2*ISO,$$

wherein ISO represents the initial sensitivity.

4. The image capture control method as claimed in claim 3, wherein step (D) further comprises, if the initial shutter exposure period t is less than or equal to the second period and exceeds the predetermined period (T), setting the final exposure period (t') and the final sensitivity (ISO') by the formula:

$$t'=T;$$

$$ISO'=ISO*t/T,$$

wherein ISO represents the initial sensitivity.

5. The image capture control method as claimed in claim 3, wherein the second period is equal to 33 ms.

6. The image capture control method as claimed in claim 4, wherein the predetermined period (T) is equal to 16.67 ms.

7. An image capture control apparatus, comprising:
a driving unit;
a lens comprising an aperture and a shutter for capturing image, wherein the aperture and the shutter are connected to the driving unit;
an image capture unit, capturing the image according to the formation of the image by the lens;
an analog-to-digital converter connected to the image capture unit, converting analog image signals output by the image capture unit to digital image signals; and
a main control unit connected to the driving unit, driving the driving unit to control the aperture and the shutter, wherein the main control unit is connected to the analog-to-digital converter for accumulatively storing digital image data output by the image capture unit, and evaluating environmental brightness according to the digital image data,
wherein the main control unit calculates initial shutter exposure period (t) and initial sensitivity (ISO) according to the environmental brightness, and determines whether the initial shutter exposure period is not larger than a predetermined period (T), and, if so, the main control unit drives the driving unit to drive the shutter to capture the image according to the initial shutter exposure period (t) and drives the analog-to-digital converter to process the captured image according to the initial sensitivity (ISO), and otherwise, the main control unit drives the driving unit to drive the shutter to capture the image with the final shutter exposure period (t') and drives the analog-to-digital converter to process the captured image with the final sensitivity (ISO') according to a predefined rule,
and wherein the predefined rule is defined as, if the initial shutter exposure period t exceeds a first period, the main control unit setting the final exposure period (t') and the final sensitivity (ISO') by the formula:

$$t'=t/3;$$

$$ISO'=3*ISO,$$

wherein ISO represents the initial sensitivity.

8. The image capture control apparatus as claimed in claim 7, wherein the main control unit further comprises a central processing unit and a memory connected to the central processing unit electrically, and the memory is connected between the central processing unit and the analog-to-digital converter.

9. The image capture control apparatus as claimed in claim 7, wherein the first period is equal to 250 ms.

10. The image capture control apparatus as claimed in claim 9, wherein the predefined rule is defined as, if the initial shutter exposure period t is not larger than the first period and exceeds a second period, the main control unit setting the final exposure period (t') and the final sensitivity (ISO') by the formula:

$$t'=t/2;$$

$$ISO'=2*ISO,$$

wherein ISO represents the initial sensitivity.

11. The image capture control apparatus as claimed in claim 10, wherein, if the initial shutter exposure period (t) is not larger than the second period and exceeds the predetermined period (T), the main control unit further sets the final exposure period (t') and the final sensitivity (ISO') by the formula:

$$t'=T;$$

$$ISO'=ISO*t/T,$$

wherein ISO represents the initial sensitivity.

12. The image capture control apparatus as claimed in claim 11, wherein the second period is equal to 33 ms.

13. The image capture control apparatus as claimed in claim 11, wherein the predetermined period is equal to 16.67 ms.

14. The image capture control apparatus as claimed in claim 7, wherein the image capture unit is a charge coupled device (CCD).

15. The image capture control apparatus as claimed in claim 7, wherein the image capture unit is a complementary metal oxide semiconductor (CMOS).

16. The image capture control apparatus as claimed in claim 8, wherein the memory of the main control unit is a synchronous dynamic random access memory (SDRAM).

* * * * *